Dec. 29, 1936.  W. REHFUS  2,065,871
AIR AND LIKE FILTER
Original Filed Jan. 26, 1935
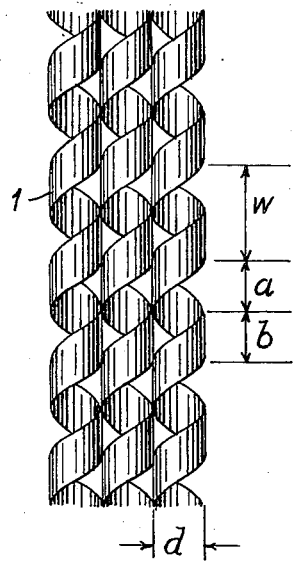
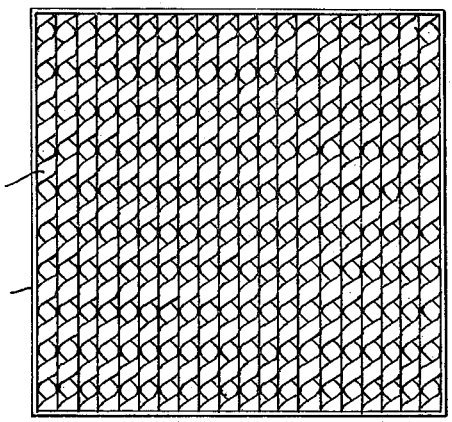
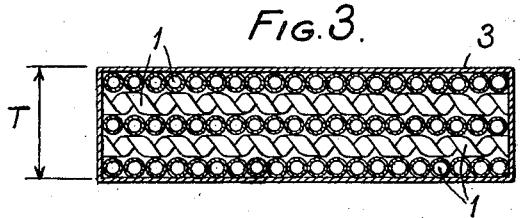
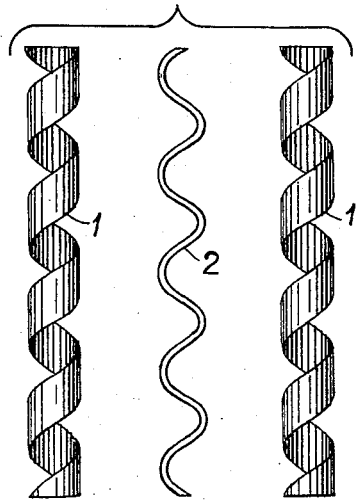
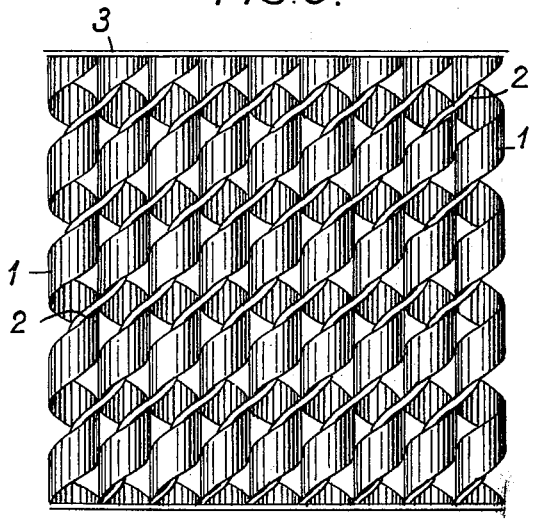
Inventor:
Wilhelm Rehfus.

Patented Dec. 29, 1936

2,065,871

UNITED STATES PATENT OFFICE 2,065,871

AIR AND LIKE FILTER

Wilhelm Rehfus, Stuttgart, Germany

Application January 26, 1935, Serial No. 3,609
Renewed September 8, 1936

4 Claims. (Cl. 183—45)

This invention relates to a filter for air and gases and consists essentially in forming the filter from layers of juxtaposed, loosely wound band coils, which are connected in each layer by wires interlaced with pairs of adjacent coils.

The band coils are preferably so constructed that the longitudinal distance between adjacent convolutions is substantially equal to the longitudinal distance across the band and preferably also to the diameter of the coils.

A filter constructed in this manner will be easily penetrated by the gas while the latter will come into intimate contact with the different filter surfaces for the deposition on the latter of particles with which the gas is laden.

The filter may be used for removing vapours of water, oil, paint and the like from gases. It can also be used merely for dividing a gas into as many whirling currents as possible, for instance in support of gas absorption and reaction. For the removal of dust from air the filter surfaces may be coated with oil in known manner.

Fig. 1 of the accompanying drawing represents a view of band coils such as employed in the filter, Fig. 2 shows on a smaller scale a complete filter, Fig. 3 is a cross-section of Fig. 2, Fig. 4 is a view of two separated band coils and the wire by means of which they are connected in the filter, and Fig. 5 is a view of a filter layer showing the connection of the coils.

The filter is made up from layers of loosely wound, juxtaposed band coils 1 which are so constructed that the longitudinal distance $a$ between adjacent convolutions is substantially equal to the longitudinal distance $b$ across the band, and also substantially equal to the diameter $d$ of the coil. Adjacent coils in each layer are interconnected by wires 2 which are interlaced with the coils. Preferably these wires are also made up into coils of the same pitch $w$ as the coils 1, as shown in Fig. 4.

The filter is built up within a frame 3 the depth T of which varies in accordance with the number of layers employed. Each additional filter layer increases the efficiency of the filter by a given percentage. Adjacent layers have their coils arranged at right angles to one another, as shown in Fig. 3. In each layer the coils are arranged so that the convolutions of one coil coincide with the spaces between the convolutions of adjacent coils.

Naturally, several frames such as shown in Fig. 2 may be combined to form a larger filter surface.

The coils are preferably made of galvanized iron so that a somewhat rough surface will be obtained to which dust and like particles can easily adhere. For clearing air of dust, the coils may be coated with oil, and the latter may, if desired, be mixed with a suitable germicide.

I claim:

1. A filter for air and gases comprising layers of loosely wound, juxtaposed band coils each having a diameter substantially equal to the longitudinal distance between adjacent band convolutions and also substantially equal to the distance across the band longitudinally of the coil, and wire coils interlaced with and connecting adjacent band coils in each layer.

2. A filter as claimed in claim 1 wherein the coils in each layer are arranged so that the convolutions of one coil coincide with the spaces between the convolutions of adjacent coils on the line of contact between them.

3. A filter as claimed in claim 1 wherein adjacent layers have their coils arranged at right angles to one another.

4. A filter for air and gases comprising layers of loosely wound, juxtaposed band coils, the distance between adjacent band convolutions being substantially equal to the distance across the band longitudinally of the coils, and wire coils interlaced with and connecting adjacent band coils in each layer.

WILHELM REHFUS.